United States Patent [19]

Morrell

[11] 3,994,179

[45] Nov. 30, 1976

[54] VALVE CONTROL

[76] Inventor: James N. Morrell, c/o E-I-M Company, Inc., Pike Road, P.O. Box 9, Missouri City, Tex. 77459

[22] Filed: Sept. 25, 1974

[21] Appl. No.: 509,295

[52] U.S. Cl. .................... 74/89.15; 74/424.8 VA
[51] Int. Cl.² ........................... F16H 27/02
[58] Field of Search ......... 74/89.14, 89.15, 424.8 R, 74/424.8 VA; 251/68–71

[56] References Cited
UNITED STATES PATENTS

| | | | |
|---|---|---|---|
| 2,222,699 | 11/1940 | Ball | 74/424.8 VA |
| 2,878,687 | 3/1959 | Kron et al. | 74/424.8 VA |
| 2,933,937 | 4/1960 | Kron et al. | 74/424.8 VA |

*Primary Examiner*—Kenneth W. Sprague
*Assistant Examiner*—James C. Yeung
*Attorney, Agent, or Firm*—Buell, Blenko & Ziesenheim

[57] ABSTRACT

The specification discloses a power operated valve operator to open and close valves. Thrust from the valve stem is transmitted to a drive sleeve journaled in a housing through a disc spring.

8 Claims, 1 Drawing Figure

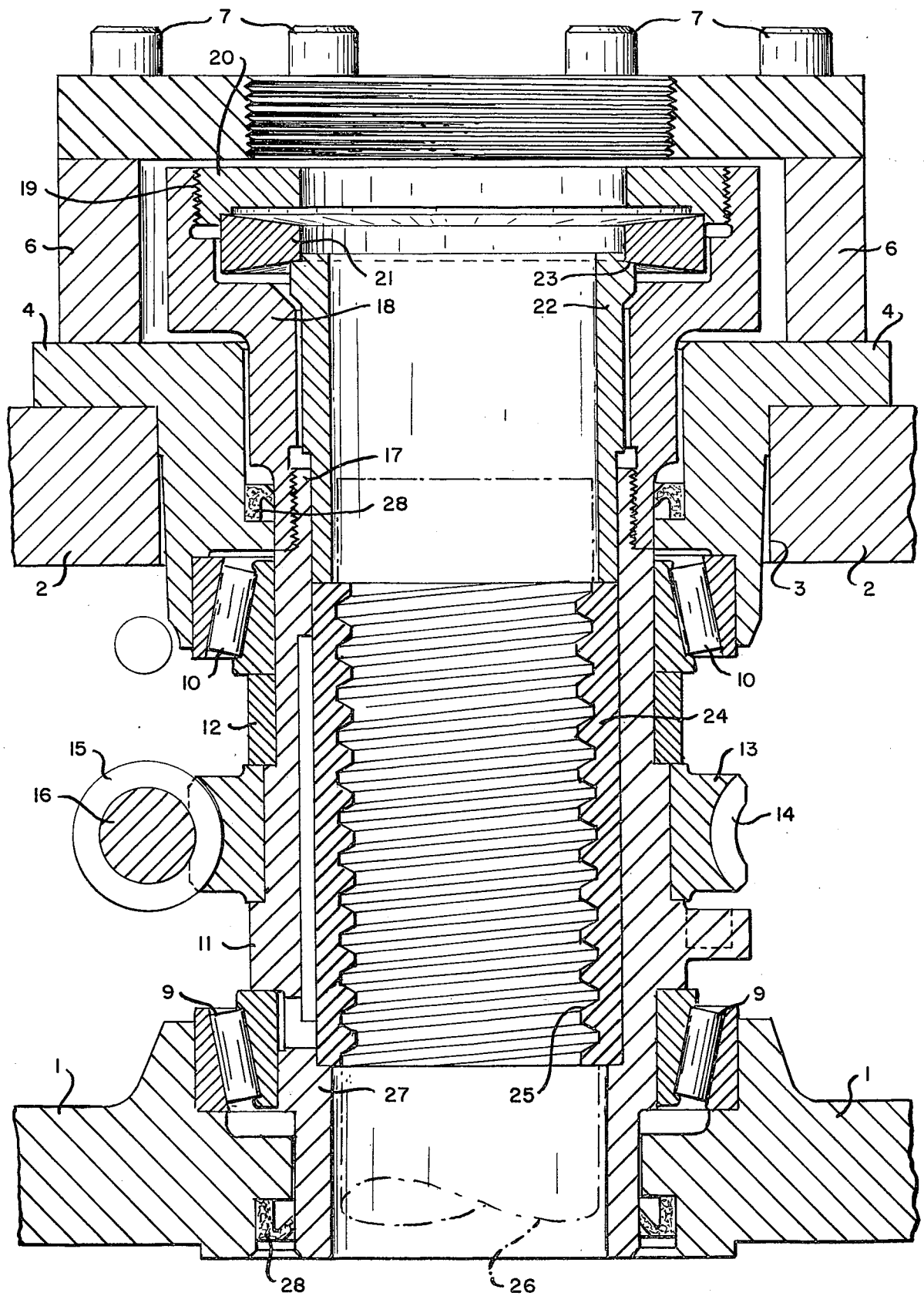

VALVE CONTROL

This invention relates to mechanical controls for actuation of valves for pipe lines and the like.

The use of various types of valves to control flow of fluid in a pipe is old and well-known. In many instances the valves are simply hand-operated. In other cases the valves are of such size that some form of mechanical assistance becomes desirable or necessary, especially if quick movement of the valve is desired. In many instances the valves are in remote or inconvenient locations such that hand operation is impractical. Accordingly, a variety of valve controls have been devised over the years. Examples are shown in Elliott et al. U.S. Pat. No. 2,775,906, Morrell U.S. Pat. No. 2,775,907, Elliott et al. U.S. Pat. No. 2,775,908, and Morrell U.S. Pat. No. 2,724,978.

Usually, a valve control is bolted to a valve body in such a manner that the valve operator cooperates with the valve to open and close the valve upon electrical signals. In a typical valve a valve member in the form of a gate is moved in the valve body to close the fluid passage through the valve body, or alternatively to leave the fluid passage unobstructed. The gate member is moved into and out of the fluid passage by a valve stem which projects from the valve body. The projecting end of the valve stem is threaded and the stem is restrained against rotation. The stem is surrounded by an internally threaded stem nut whose threads engage the threads of the valve stem. Movement of the stem nut is restrained axially but it is free to rotate. Accordingly, rotation of the stem nut causes movement of the stem into and out of the valve body and moves the gate to open or closed position. In certain prior controls, it has been the practice to journal the stem nut, either directly or in a carrier, in bearings fitted in a surrounding housing which is integral with the valve body. Thus, rotation of the stem nut in the bearings is effective to open and close the valve.

Conveniently, the stem nut is driven by a worm shaft rotated by an electric motor. When the valve is closing and power to the motor is cut off, there will be some drift in the moving parts due to inertia, especially rotational inertia of the motor. In slow operating valve controls, the problem is not too serious. As the desired speed of a valve control increases, however, the inertia forces become greater. It is difficult to cut off power at the exact moment necessary to close the valve firmly without undue stresses or without leaving slight leakage. Moreover, the valve may bounce back from the fully closed position if closed too hard.

The problem is accentuated by the fact that many valves operate in environments where there are significant changes in temperature causing the valve and valve control to expand and contract. For example, a valve may be closed while at ambient temperature and then be subjected to high temperature steam. Although the valve may be fully closed when cold the expansion may cause it to become "cracked" open. Conversely, if the valve is closed at a high temperature and then cools, excessively high stresses may be developed in the valve gate, valve stem, valve body, and valve control. In such a case the motor may be overloaded in trying to open the valve because of excessive loadings developed through thermal contraction. Some designers have sought to introduce some type of spring into the mechanism, but the designs have been cumbersome and excessively expensive.

I provide valve body means and a valve stem projecting therefrom, valve stem drive means journaled for rotation, valve stem nut means engaging the drive means for rotation of the nut means, but being capable of axial movement relative to the drive means, and yielding means transmitting force between the drive means and the nut means whereby the nut means are urged toward the valve body. I prefer to provide thin flat yielding means positioned adjacent the end of the stem nut away from the valve body and engaging a member extending from the drive means. I further prefer to provide disc spring means which yieldingly urge the stem and nut means toward the valve body and transmit an opposing force through the stem drive means. I prefer to drive the stem drive means through a motor worm shaft to a worm gear. I prefer to enclose the stem drive means, yielding means, and stem nut means in a housing which is attached to and becomes mechanically integral with the valve body.

Other details, objects and advantages of my invention will become apparent as the following description of a present preferred embodiment thereof proceeds.

In the accompanying drawing I have shown a present preferred embodiment of the invention. A valve operator housing member includes a lower section 1 and an upper section 2. The housing member is connected to the valve body either directly or through another intermediate member. The general relationship and relative arrangement of valve body and valve operator housing are well-known and are described, for example in my earlier U.S. Pat. No. 2,724,978 and 2,775,907. Accordingly, that general arrangement is not further illustrated or described herein, beyond stating that the valve body is below lower housing section 1 as shown in the drawing.

An opening 3 is formed in the upper section of the housing member and a housing cover 4 is arranged to fit in the opening. A top flange 5 is positioned axially above opening 3 and housing cover 4. Flange 5 is spaced from housing cover 4 by a flange ring 6. Housing cover 4, top flange 5, and flange ring 6 are held in position upon the upper section of the housing by a group of cap screws 7 which extend through the parts and into threaded holes in housing 2. A central hole 8 is formed in top flange 5 and is threaded internally to receive an elongated tubular cover into which the valve stem will project when the valve is open.

Roller bearings 9 and 10 are fitted internally of the housing and carry a circular, hollow drive sleeve 11. A spacer 12 is provided concentric with drive sleeve 11 which keeps the drive sleeve located between bearings 9 and 10 without any axial movement. A gear ring 13 is fitted concentrically around the outside of drive sleeve 11 and may conveniently be a running fit on the drive sleeve with engaging lugs. A worm gear 14 engages a worm 15 mounted on an electric motor shaft or an intermediate shaft. The upper end of drive stem 11 is fitted with external threads at 17 which engage cooperating threads in a tension member 18. Tension member 18 extends upwardly from threads 17 into the area enclosed by housing cover 4, top flange 5 and flange ring 6. Tension member 18 has internal threads 19 at its upper end which engage cooperating threads upon a thrust retainer nut 20. Nut 20 threads into the upper end of tension member 18 and has a central spring which is coaxial with like openings in compression member 22 and drive sleeve 11.

A disc spring 21 is positioned beneath thrust retainer 20. The disc spring is trapezoidal in cross section. The major base of the trapezoid constitutes the outer circumference of the disc spring and the minor base of the trapezoid constitutes the inner circumference of the disc spring. The disc spring is mounted beneath thrust retainer 20 with the outer circumference bearing against the bottom of thrust retainer 20. Conveniently, a recessed shoulder is provided in the lower face of thrust retainer 20 to receive the disc spring.

A compression member 22 is fitted beneath disc spring 21. Compression member 22 has a shoulder 23 formed around the upper, outer circumference which cooperatively engages the inner circumference of disc spring 21. A stem nut 24 is located concentrically within drive sleeve 11 and has an internal thread 25. Thread 25 engages a cooperating thread upon valve stem member 26. Stem nut 24 is rotatably engaged with drive sleeve 11 by a spline or keyway which permits relative movement of sleeve member 11 and stem nut 24 in an axial direction, but which prevents relative rotational motion between them. Stem nut 24 fits in a recessed shoulder 27 formed in the inner circumference of drive sleeve 11. Oil seals 28 are fitted to prevent leakage from the valve operator housing.

The valve operator may be assembled by placing bearings 9 and 10 in position upon drive sleeve 11 with compression member 12. The upper section 2 of the valve operator housing may then be fastened into position by bolts (which are omitted from the drawing for simplicity). Stem nut 24 may then be positioned followed by compression member 22, disc spring 21, tension member 19 and thrust retainer 20. Then the cover pieces are fastened in position.

When the valve is to be opened the drive motor is operated causing shaft 16 and worm 15 to rotate. Worm 15 engages worm gear teeth 14 and rotates drive sleeve 11. The splined connection between drive sleeve 11 and stem nut 24 causes the stem nut to be rotated with the drive sleeve. Since axial movement of the stem nut is prevented, rotation of sleeve 11 will cause valve stem 26 to be withdrawn from the valve body bringing the valve gate to open position.

When the valve is to be closed the motor shaft is operated in the opposite direction causing the valve stem to move towards the valve body. Desirably power to the motor is shut off at such a time that the gate will be bottomed under some pressure. As the gate starts to seat, pressure will be transmitted through the gate and up the valve stem to stem nut 24. The pressure is then transmitted through compression member 22 to disc spring 21 and by it to thrust retainer 20. The force is transferred from thrust retainer 20 to tension member 18 and then to drive sleeve 11 from which the thrust is transferred to the bearings which carry the load. As the thrust increases the disc spring will yield and become distorted. Increasing load will tend to push the inner circumference of the spring out of the plane of the spring thereby increasing its resistance to deformation. A disc spring has a high spring rate. Accordingly a spring capable of handling high loads with a small deflection can be employed. Moreover, the load is transmitted through compression member 22, tension member 18, and drive sleeve 11, and their natural elasticity helps to absorb stresses produced from the gate pressure on the valve body.

It will be seen, therefore, that my design makes it possible to absorb substantial stresses in a relatively small and confined space without complexity. The apparatus may be fitted within the same housing used for conventional valve operators. Also existing valve operators may be modified in accordance with the invention using the existing valve operator housing. The invention avoids extra size in the operator and avoids the need for extra bearings that would be required for a larger unit. The elasticity in the elements transmitting thrust from stem unit 24 to the bearings, avoids undue stresses in the mechanism, due to thermal stresses or improper shut off of the motor, especially during high speed operation. A substantial amount of stress is absorbed by the disc spring. Due to its high spring rate, little space is required, and the overall dimensions of the valve operator are substantially the same as for a conventional valve operator.

While I have illustrated and described a present preferred embodiment of my invention it is to be understood that I do not limit myself thereto and that my invention may be otherwise variously practiced within the scope of the following claims.

I claim:

1. A valve operator adapted to move a valve stem between open and closed valve positions in a valve body and characterized by low height and a small number of component parts, said valve operator comprising a housing rigid with the valve body, stem nut means threadably engaging the valve stem, drive sleeve means coaxial with the stem nut means, said drive sleeve means engaging the stem nut for rotational movement only and permitting relative axial movement between the stem nut means and the drive sleeve means, bearing means journaling the drive sleeve means in the housing, a tension member engaging the drive sleeve means annd extending beyond the journal means in a direction opposite to the valve body, a compression member coaxial with the tension member and abutting the stem nut means, disc spring means interposed in thrust transmitting relationship between the compression member and the tension member whereby compressive forces generated in the valve stem upon closing of the valve are transmitted in sequence from the valve stem, to the stem nut means, to the compression member, to the disc spring means, to the tension member, to the drive sleeve means, and through the bearing means to the housing, and power means operable to rotationally drive the valve sleeve means.

2. A valve operator as set forth in claim 1 in which the drive sleeve means is in surrounding position to the stem nut means and the stem nut means are bottomed in the drive sleeve means.

3. A valve operator as set forth in claim 2 in which the drive sleeve is driven by an electric motor through a worm gear.

4. A valve operator adapted to move a valve stem and valve member between open and closed valve positions in a valve body comprising a housing rigid with the valve body, stem nut means surrounding a valve stem and threadably engaging the valve stem, drive sleeve means surrounding the stem nut means, radial surfaces of the stem nut means and drive sleeve means being in juxtaposition whereby rotation of the drive sleeve means rotates stem nut means and the drive sleeve means and stem nut means are free for relative axial movement, a compression member in juxtaposition to the outer end of the stem nut means, a tension member connected to two drive sleeve means, and disc spring means interposed between the compression member and the tension member.

5. A valve operator as set forth in claim 4 in which the outer circumference of the disc spring transmits thrust to the tension member and the inner circumference of the disc spring is in juxtaposition to the compression member to receive thrust from the compression member.

6. In a valve operator having a stem nut threadably engaging a valve stem, a drive sleeve engaging the stem nut for rotational motion, and power means operable to rotate the drive sleeve about the axis of the valve stem, the improvement which comprises a compression member bearing against the stem nut, a tension member connected to the drive sleeve, and disc spring means interposed between the compression member and the tension member whereby axial thrust applied to the valve stem nut is transmitted through the compression member, the disc spring, and tension member to the drive sleeve.

7. A valve operator improvement as set forth in claim 6 in which the compression member is in juxtaposition to the inner circumference of the disc spring and the outer circumference of the disc spring is in juxtaposition to the tension member.

8. A valve operator improvement as set forth in claim 7 in which a radially tapered disc spring is interposed between the compression member and the tension member.

* * * * *